US012665475B2

(12) United States Patent
Lee

(10) Patent No.: US 12,665,475 B2
(45) Date of Patent: Jun. 23, 2026

(54) ANTI-EROSION STRUCTURE HAVING GROUND STRUCTURE WITH BRUSHES INTO THE SHAFT

(71) Applicant: HYUNDAI MOBIS CO., LTD., Seoul (KR)

(72) Inventor: Sanghan Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 519 days.

(21) Appl. No.: 18/088,010

(22) Filed: Dec. 23, 2022

(65) Prior Publication Data

US 2023/0353021 A1 Nov. 2, 2023

(30) Foreign Application Priority Data

Apr. 28, 2022 (KR) ........................ 10-2022-0052644

(51) Int. Cl.
 *H02K 11/40* (2016.01)
 *H02K 5/14* (2006.01)
(52) U.S. Cl.
 CPC ............. *H02K 11/40* (2016.01); *H02K 5/145* (2013.01)
(58) Field of Classification Search
 CPC .......... H02K 5/14; H02K 5/145; H02K 5/161; H02K 5/15; H02K 5/16; H02K 5/163; H02K 5/165; H02K 5/132; H02K 5/24; H02K 11/40; H02K 11/00; H02K 11/026; H02K 11/028

USPC ........................................................ 310/239
See application file for complete search history.

(56) References Cited

U.S. PATENT DOCUMENTS

| | | | | |
|---|---|---|---|---|
| 2,254,277 | A * | 9/1941 | Ehlers | H01R 39/40 |
| | | | | 310/247 |
| 3,757,164 | A * | 9/1973 | Binkowski | H05F 3/02 |
| | | | | 361/221 |
| 11,512,740 | B2 * | 11/2022 | Berruet | F16C 41/002 |
| 11,549,556 | B2 * | 1/2023 | Berruet | F16C 19/52 |
| 11,773,908 | B1 * | 10/2023 | Kovacs | F16C 19/14 |
| | | | | 384/513 |
| 2021/0310517 | A1 * | 10/2021 | Berruet | H01R 39/39 |
| 2021/0310518 | A1 * | 10/2021 | Berruet | F16C 41/002 |
| 2021/0310520 | A1 * | 10/2021 | Arnault | F16C 35/077 |
| 2021/0364040 | A1 * | 11/2021 | Arnault | F16C 41/002 |

FOREIGN PATENT DOCUMENTS

| | | | | |
|---|---|---|---|---|
| KR | 10-1442414 | 9/2014 | | |
| WO | WO-2019238358 A1 * | 12/2019 | ............. | H02K 7/003 |

* cited by examiner

*Primary Examiner* — Maged M Almawri
(74) *Attorney, Agent, or Firm* — NSIP Law

(57) ABSTRACT

Disclosed is an anti-erosion structure of a motor that includes a housing, a stator disposed inside the housing, a rotor disposed inside the stator, a shaft disposed inside the rotor, a rear cover coupled to a rear of the housing, and a ground structure for grounding the shaft. The ground structure is inserted into the shaft with one side of the ground structure in contact with the rear cover.

20 Claims, 9 Drawing Sheets

ANTI-EROSION STRUCTURE HAVING GROUND STRUCTURE WITH BRUSHES INTO THE SHAFT

CROSS-REFERENCE TO RELATED APPLICATION

This application claims the benefit under 35 USC § 119(a) of Korean Patent Application No. 10-2022-0052644, filed on Apr. 28, 2022, in the Korean Intellectual Property Office, the entire disclosure of which is incorporated herein by reference for all purposes.

BACKGROUND

1. Field

The present disclosure relates to anti-erosion structure of a motor in which a ground structure is inserted into a shaft to ground the shaft.

2. Description of Related Art

Pure electric-powered eco-friendly vehicles include electric vehicles or fuel cell vehicles. These vehicles are known to include an electric motor (hereinafter, referred to as a "motor") mounted as a driving source for obtaining rotational power with electric energy instead of an internal combustion engine such as the existing engine.

The motor used as the power source for the eco-friendly vehicle includes a housing, a stator fixedly installed inside the housing, and a rotor disposed with a predetermined gap from the stator and rotating around a shaft as a drive shaft. The motor is supplied with three-phase AC power through an inverter. The inverter converts DC power of a battery into 3-phase AC through power module switching. In this case, a three-phase voltage is not in the form of a perfect sine wave, and a total sum of the three-phase voltage is not 0 in the form of a square wave. This is called a common mode voltage. Due to the common-mode voltage applied to a coil of the motor, a shaft voltage is generated on the shaft due to the effect of a parasitic capacitance inside the motor. The shaft voltage causes a potential difference between inner and outer rings of the bearing that supports the shaft, and causes erosion of the bearing by a discharge mechanism inside the bearing. The erosion has a serious impact on the durability of the drive motor, such as damaging the bearing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an anti-erosion structure of a motor capable that includes a housing, a stator disposed inside the housing, a rotor disposed inside the stator, a shaft disposed inside the rotor, a rear cover coupled to a rear of the housing, and a ground structure configured to ground the shaft. The ground structure is configured to be inserted into the shaft so that one side of the ground structure is in contact with the rear cover.

The ground structure may include a brush holder which has a structure in which an interior portion of the brush holder is hollow and one side of the brush holder is open, a brush, configured to be at least partially inserted into the brush holder, and which has one end in contact with the rear cover, and a spring, inserted into the brush holder, and configured to press the brush holder.

The ground structure may further include a ground wire that is inserted into the brush holder and is electrically connected to the brush.

The shaft may be a solid shaft. One end of the shaft may be provided with a groove that is recessed inward along an axial direction, and the ground structure may be inserted into the groove of the shaft.

A diameter of the groove of the shaft is equal to or less than a diameter of the brush holder, so that the brush holder is press-fitted into the groove of the shaft.

A thread may be formed on at least one of an inner surface of the groove of the shaft and an outer surface of the brush holder, so that the brush holder is screwed into the groove of the shaft.

The shaft may include a hollow internal portion, and the ground structure may be inserted into the hollow internal portion of the shaft.

A diameter of the hollow internal portion of the shaft may be equal to or less than a diameter of the brush holder, so that the brush holder is press-fitted into the groove of the shaft, or a thread may be formed on at least one of an inner surface of the hollow internal portion of the shaft and an outer surface of the brush holder, so that the brush holder is screwed into the hollow internal portion of the shaft.

The diameter of the hollow internal portion of the shaft may be configured to be larger than a diameter of the brush holder, the ground structure may further include an outer holder configured to receive the brush holder, and the outer holder may be inserted into the hollow internal portion of the shaft.

A diameter of a hollow internal portion of the outer holder may be equal to or less than the diameter of the brush holder, so that the hollow internal portion of the outer holder is press-fitted into the brush holder, or a thread may be formed on at least one of an inner surface of the hollow internal portion of the outer holder and an outer surface of the brush holder, so that the brush holder is screwed into the hollow internal portion of the outer holder.

An outer peripheral surface of the brush holder includes a flange part that protrudes outward.

The outer peripheral surface of the brush holder may include an air removal groove that is recessed inward by a predetermined amount from a first end of the brush holder to a second end of the brush holder in an axial direction.

The brush holder may be configured to have a cylindrical shape, and, and the brush may configured to have at least one of a cylindrical shape and a prismatic shape.

A front surface of the rear cover may include a contact member that is configured to be in contact with the brush, and the contact member may be formed of a metal material that is different from a material of the rear cover.

A front surface of the rear cover may include a holder receiving part that protrudes to the front surface of the rear cover by a predetermined amount and is configured to have a hollow center, and the brush holder may protrude outward of the shaft and may be configured to be at least partially inserted into the hollow center of the holder receiving part.

The holder receiving part may include at least one oil hole that penetrates through the holder receiving part in a radial direction, and is configured to discharge oil flowing into the holder receiving part.

A front surface of the holder receiving part may include a shaft receiving part that protrudes to the front surface of the holder receiving part by a predetermined amount, and is configured to have a hollow center, and one end portion of the shaft may be inserted into the center of the shaft receiving part.

The shaft receiving part may include at least one oil hole that penetrates through the shaft receiving part in a radial direction, and is configured to discharge oil flowing into the shaft receiving part.

An inner peripheral surface of the shaft receiving part may include at least one ring-shaped groove that is recessed inward along a circumferential direction.

The outer peripheral surface of the one end portion of the shaft may include at least one ring-shaped groove that is recessed inward along a circumferential direction.

Other features and aspects will be apparent from the following detailed description, the drawings, and the claims.

BRIEF DESCRIPTION OF THE DRAWINGS

FIGS. 15 (a) and (b) are diagrams illustrating a rear cover according to an example.

FIG. 16 is a diagram illustrating a rear cover according to another example.

Figure 1:
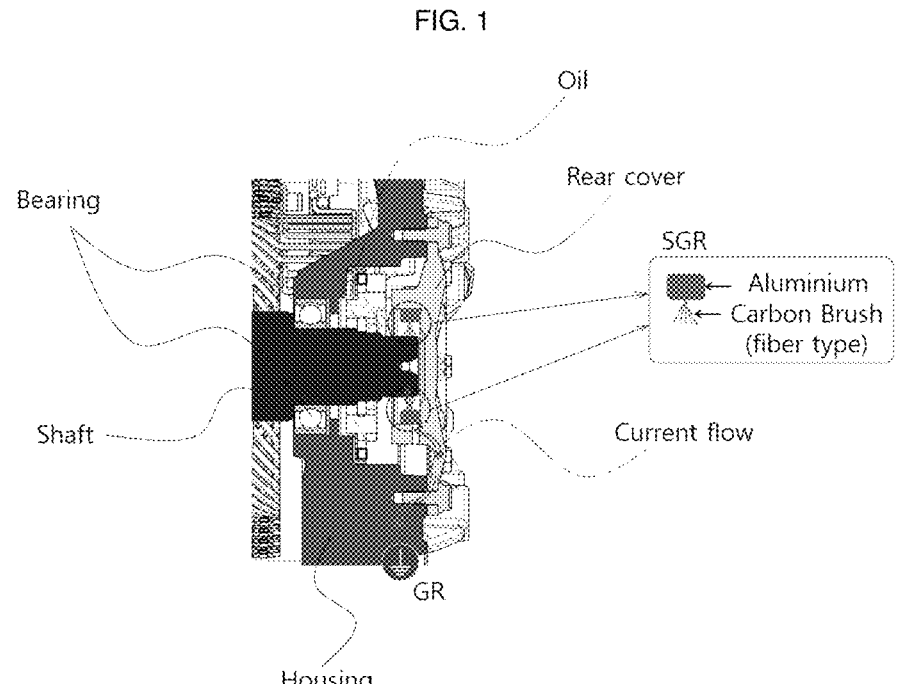
FIG. 1 is a diagram illustrating the related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The use of the term "up" or "upward" herein is meant to refer to a direction wherein a corresponding vehicle includes wheels on a lower portion of the vehicle compared to a roof of the vehicle in an upper portion of the vehicle.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a diagram illustrating the related art. In the related art, a shaft ground ring (SGR) that conducts electricity between the housing and the shaft is installed between the housing and the shaft in order to reduce the shaft voltage generated on the shaft of the motor. The ground ring should electrically ground the rotating shaft and the fixed housing. Accordingly, friction is generated between the ground ring and the shaft, and the durability of the ground ring may inevitably deteriorate due to the generated friction. In addition, a brush applied to the ground ring has reduced oil resistance and is vulnerable to damage caused by automatic transmission fluid (ATF) oil. In addition, there is a disadvantage in that the ground ring is expensive.

Figure 2:
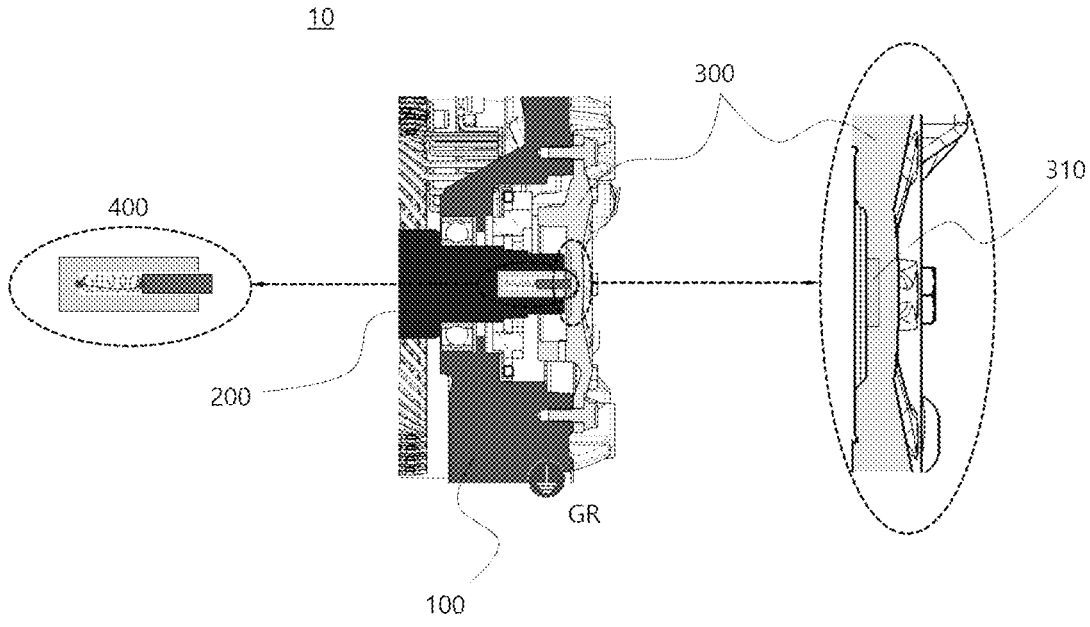
FIG. 2 is a diagram illustrating a motor according to an example embodiment.

FIG. 2 is a diagram illustrating a motor according to an embodiment. A motor 10 includes a housing 100, a stator (not illustrated) disposed inside the housing, a rotor (not illustrated) disposed inside the stator, a shaft 200 disposed inside the rotor, a rear cover 300 coupled to a rear of the housing 100, a ground structure 400 for grounding the shaft 200, and a bearing (not illustrated) disposed between the shaft 200 and the housing 100.

Figure 3:
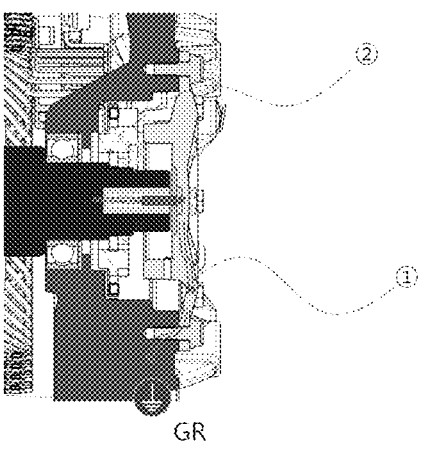
FIG. 3 is a diagram illustrating a flow of current by a shaft voltage of a shaft in FIG. 2.

The present disclosure relates to an anti-erosion structure of a motor, and by grounding the shaft 200 through the ground structure 400, it is possible to prevent erosion of a bearing due to a shaft voltage generated on the shaft 200. More specifically, the ground structure 400 is inserted into the shaft 200 so that one side of the ground structure 400 is in contact with the rear cover 300. The ground structure 400 is configured in the form of a column extending in an axial direction, and thus, may be referred to as a columnar axial ground contact (AGC). FIG. 3 is a diagram illustrating a flow of current due to the shaft voltage of the shaft in FIG. 2, and as illustrated in FIG. 3, a shaft voltage current of the shaft moves to the rear cover through the ground structure along path ①, and then, does not pass through the bearing as the shaft is grounded (GR) to the housing, thereby preventing the erosion of the bearing. In this case, it is possible to improve space utilization and structural robustness in the motor by inserting the ground structure into the shaft.

Figure 4:
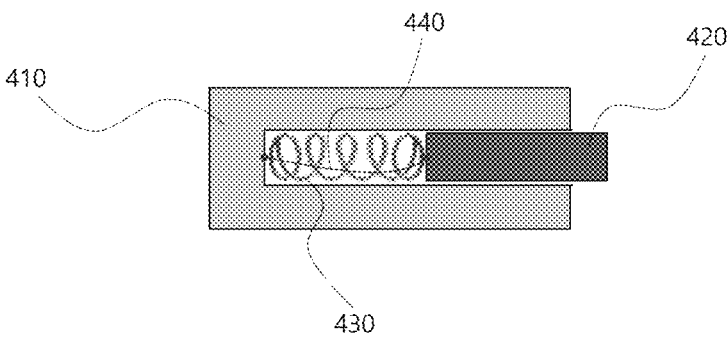
FIG. 4 is a cross-sectional view schematically illustrating a ground structure according to an embodiment.

FIG. 4 is a cross-sectional view schematically showing a ground structure according to an embodiment. As illustrated, the ground structure 400 has a structure including a brush holder 410, a brush 420, and a spring 430.

The brush holder 410 has a structure in which an inside of the brush holder 410 is hollow and one side of the brush holder 410 is opened, and the inside of the brush holder 410 receives the brush 420 and the spring 430, and may be made of a metal material.

The brush 420 is at least partially inserted into the brush holder 410, so one end of the brush 420 is in contact with the rear cover 300, and may be made of the same or different metal material as the brush holder 410.

The spring 430 is inserted into the brush holder 410 to press the brush 420, and one side of the spring 430 may be fixedly coupled to a bottom surface of the brush holder 410, and the other side thereof may be fixedly coupled to the other end of the brush 420. The spring 430 itself may be made of a metal material and may be electrically connected to the brush 420, but may not have high conductivity due to the material characteristics and coupling structure.

Accordingly, the embodiment may further include a ground wire 440 electrically connecting the brush 420, and the ground wire 440 may be inserted into the brush holder 410 to electrically connect between the brush 420 and the brush holder 410, so it is possible to improve the electrical connectivity between the brush 420 and the brush holder 410.

Figure 5:
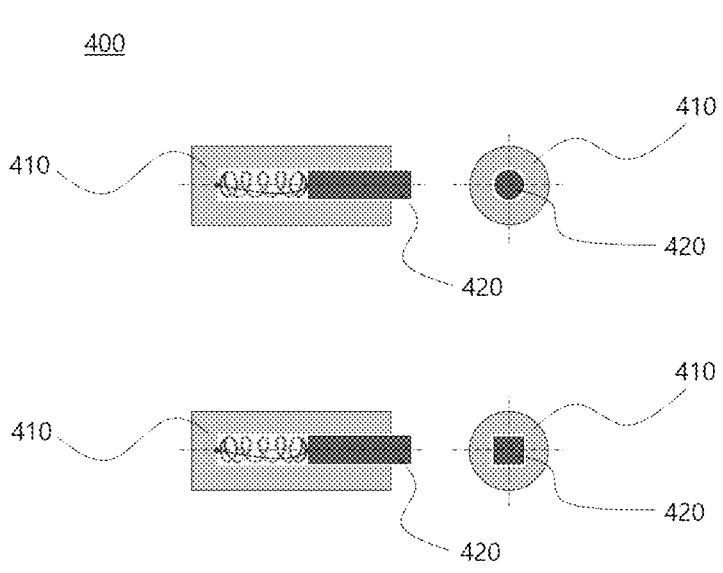
FIG. 5 is a diagram illustrating a vertical cross section in an axial direction of the ground structure of FIG. 4.

FIG. 5 is a diagram illustrating a vertical cross section of the ground structure of FIG. 4 in the axial direction. As illustrated, the brush holder 410 may have a cylindrical shape, and the brush 420 may have a cylindrical shape or a prismatic shape. The hollow shape of the brush holder 410 may be formed to correspond to the brush shape.

According to the embodiment, it is possible to adjust the contact pressure between the pillar-shaped brush 420 and the rear cover 300 through the spring 430, and easily adjust the lifespan or conduction performance of the brush 420 by changing only an elastic force of the spring 430.

Hereinafter, the coupling structure between the shaft and the ground structure will be described. First, the shaft 200 may be a solid shaft or a hollow shaft.

Figure 6:
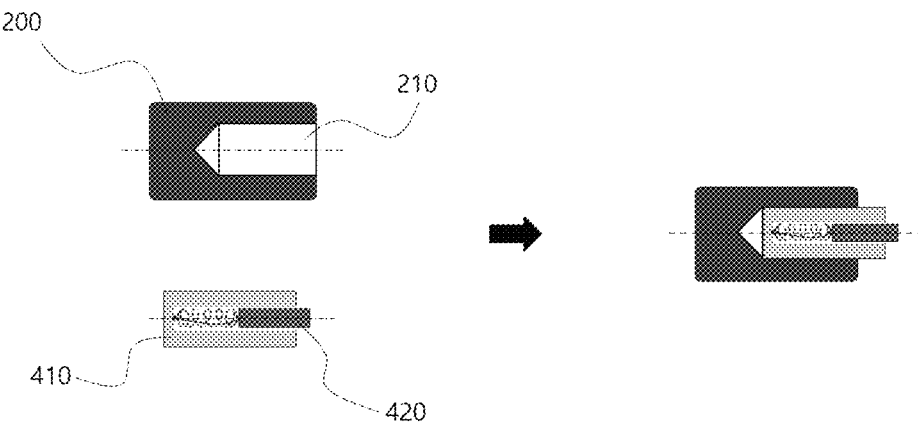
FIGS. 6 and 7 are diagrams for describing a coupling structure of the ground structure in a solid shaft.
Figure 7:
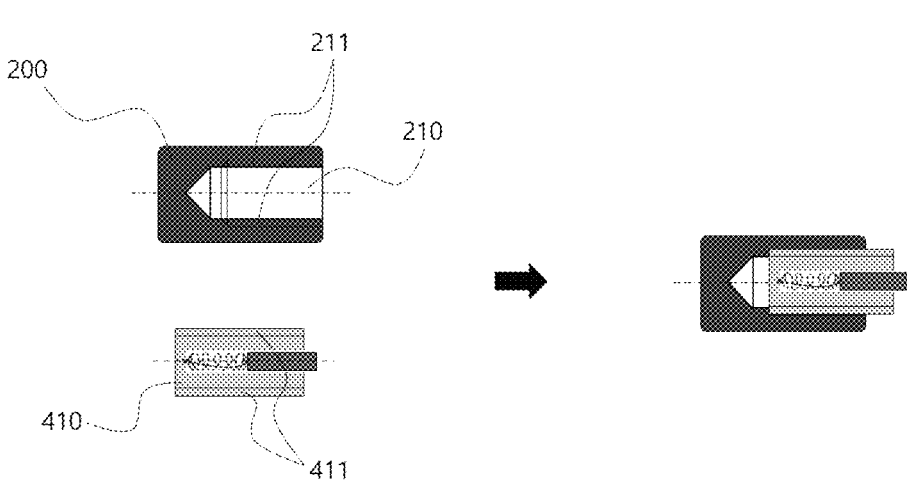

FIGS. 6 and 7 are diagrams for describing the coupling structure of the ground structure in the solid shaft. When the shaft 200 is a solid shaft, one end portion of the shaft 200 has a groove 210 recessed inward along the axial direction, and the ground structure 400 may be inserted into the groove 210 of the shaft. The groove 210 of the shaft may be formed through hole processing.

FIG. 6 is a first coupling example in the solid shaft. According to this example, the diameter of the groove 210 of the shaft may be formed to be the same as or smaller than that of the brush holder 410, and the brush holder may be press-fitted into the groove 210 of the shaft. That is, the brush holder 410 may be intermediately fitted or press-fitted into the groove 210 of the shaft. In this example, by adjusting at least one of the depth of the groove 210 of the shaft and the insertion depth of the brush holder 410, the degree of protrusion of the brush 420 or the like may be appropriately adjusted.

FIG. 7 is a second coupling example in the solid shaft. According to this example, at least one of the inner surface of the groove 210 of the shaft and the outer surface of the brush holder 410 may be provided with a thread 211 or 411, so the brush holder 410 may be screwed into the groove 210 of the shaft. The inner surface of the groove 210 of the shaft may be tapped. In this example, an assembly depth of the brush holder 410 may be easily adjusted or modified, and the coupling structure 400 may be easily replaced.

FIGS. 8 to 11 are diagrams for describing the coupling structure of the ground structure in the hollow shaft, and when the shaft 200 is a hollow shaft, the ground structure 400 may be inserted into the hollow 220 of the shaft.

Figure 8:
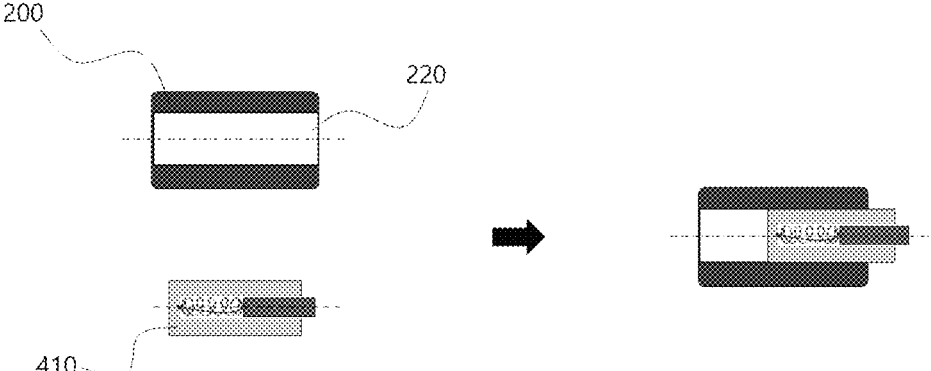
FIGS. 8 to 11 are diagrams for describing the coupling structure of the ground structure in a hollow shaft.
Figure 9:
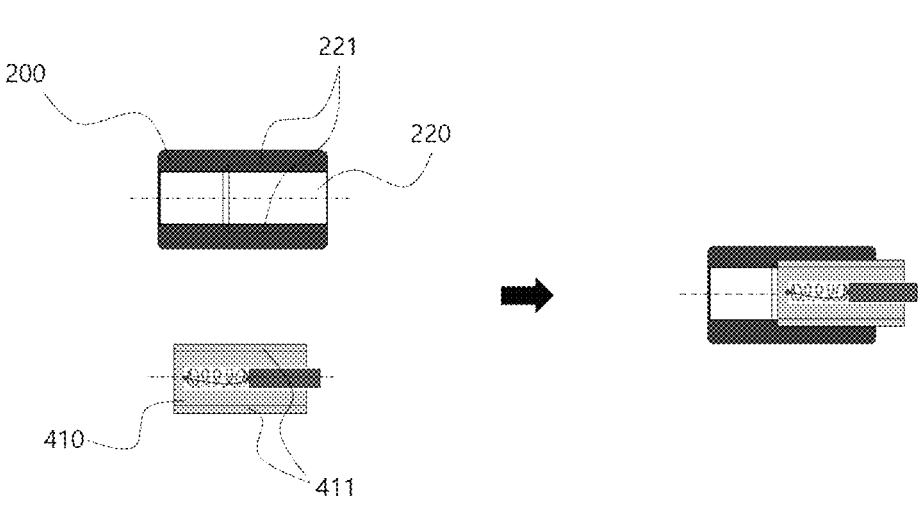

FIGS. 8 and 9 are examples of coupling when the diameter of the hollow of the shaft is the same as or smaller than that of the brush holder. As illustrated in FIG. 8, the brush holder 410 is press-fitted into the hollow 220 of the shaft or as illustrated in FIG. 9, the screw thread 221 or 411 is formed on at least one of the inner surface of the hollow 220 of the shaft and the outer surface of the brush holder 410, so the brush holder 410 may be screwed into a hollow 220 of the shaft. This may be done in substantially the same way as the press-fit and screw coupling structures described above.

Figure 10:
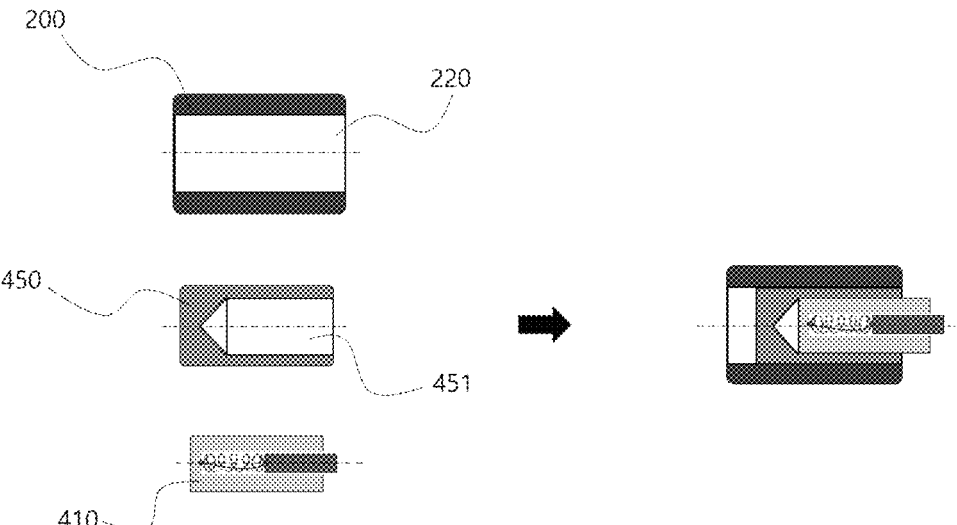
Figure 11:
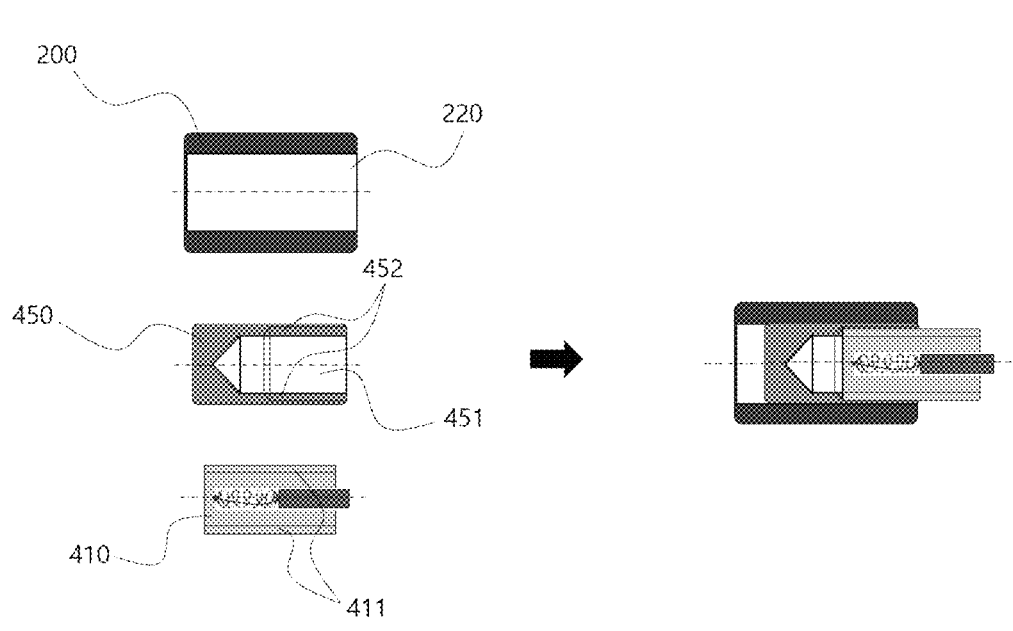

FIGS. 10 and 11 illustrate a coupling example in which the diameter of the hollow of the shaft is larger than that of the brush holder. In this example, the ground structure 400 further includes an outer holder 450 receiving the brush holder 410 therein, and the outer holder 450 may be inserted into the hollow 220 of the shaft. More specifically, the diameter of the outer holder 450 is equal to or larger than that of the hollow 220 of the shaft, so the outer holder 450 is press-fitted into the hollow 220 of the shaft, or although not illustrated separately, the outer holder 450 may be screwed into the hollow 220 of the shaft by using the screw. This may be done in substantially the same way as the press-fit and screw coupling structures described above.

The brush holder 410 may be received inside the outer holder 450 press-fitted into the hollow 220 of the shaft as described above. Specifically, as illustrated in FIG. 10, the diameter of the hollow 451 of the outer holder is formed equal to or smaller than that of the brush holder 410, so the brush holder 410 is press-fitted into the hollow 451 of the outer holder, or as illustrated in FIG. 11, a thread 452 or 411 is formed on at least one of the inner surface of the hollow 451 of the outer holder and the outer surface of the brush holder 410, so the brush holder 410 may be screwed into the hollow 451 of the outer holder. This may be done in substantially the same way as the press-fit and screw coupling structures described above.

Based on the above description, the ground structure 400 may be inserted into the shaft 200.

Figure 12:
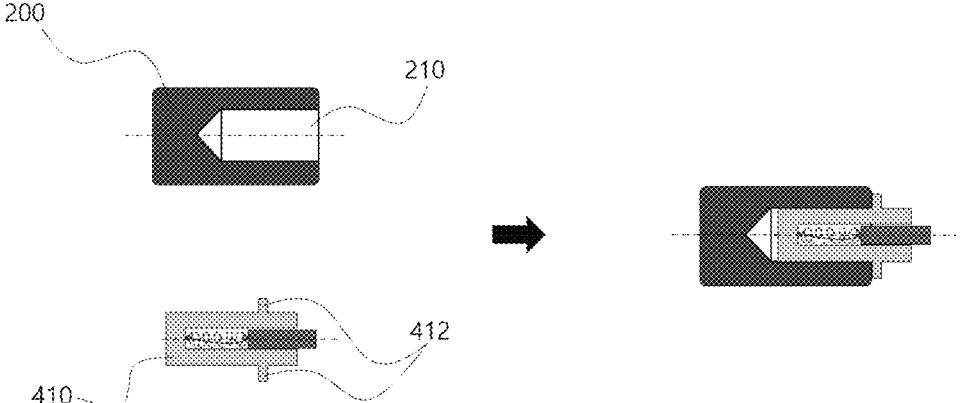
FIG. 12 is a diagram illustrating a ground structure according to another example.

FIG. 12 is a diagram illustrating a ground structure according to another example. As illustrated, a flange part 412 protruding outwardly may be provided on an outer peripheral surface of the brush holder 410 of this example. The flange part 412 may have, for example, a structure protruding in a ring shape along a circumferential direction of the outer peripheral surface of the brush holder 410, or may have a plurality of protrusion structures located on the same circumference.

When the ground structure 400 is press-fitted by forming a groove 210 on the solid shaft, the other end portion of the groove 210 is closed, so air is compressed when the ground structure is press-fitted. As a result, an excessive height deviation may occur whenever the ground structure is assembled. When the press-fitting depth is slightly smaller than the expected depth, the contact pressure of the brush applied to the contact surface of the rear cover may increase and the wear amount of the brush may increase, thereby shortening the lifespan, and when the press-fitting depth is larger than the expected depth, the contact pressure of the brush is lowered, thereby lowering the current flow performance.

In this example, as the flange part 412 is provided on the outer side of the brush holder 410, the brush holder 410 may be assembled to a certain height when assembled on the shaft 200, so that it is possible to prevent a difference in the assembly depth of the brush holder, that is, a height deviation from occurring.

Figure 13:
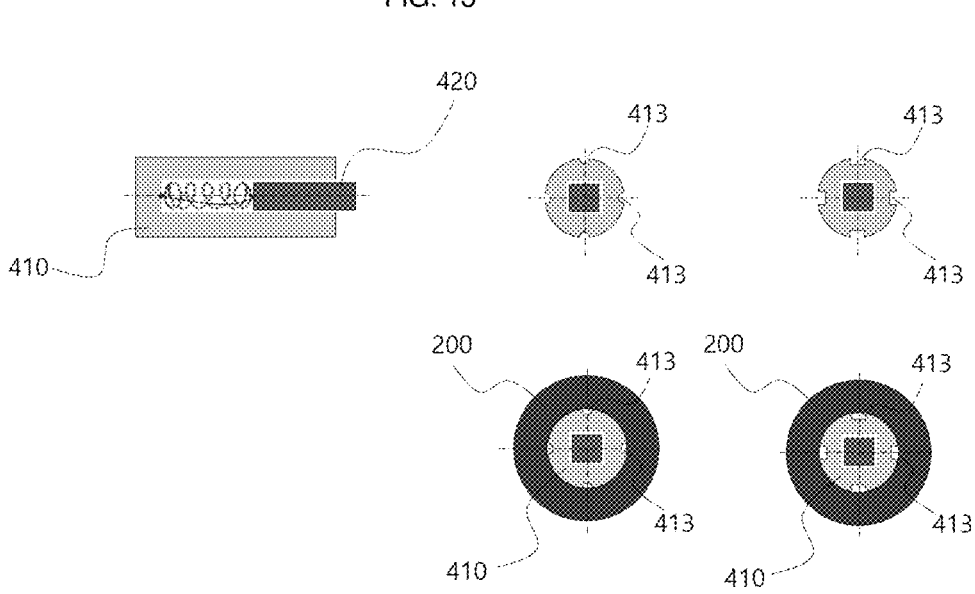
FIG. 13 is a diagram illustrating a ground structure according to still another example.

FIG. 13 is a diagram illustrating a ground structure according to another example. As illustrated, the outer peripheral surface of the brush holder 410 of this example may be provided with at least one air removal groove 413 that is recessed inward by a predetermined amount and extends from one end to the other end in an axial direction. The air removal groove 413 may be formed in a circular or prismatic cross-section, and may be formed in upper, lower, left, and right, respectively. As described above, since the air removal groove 413 is formed in the brush holder 410, so it is possible to prevent air from being compressed inside a shaft groove 210 when the brush holder 410 is press-fitted.

Hereinafter, the rear cover of an embodiment will be described.

Figure 14:
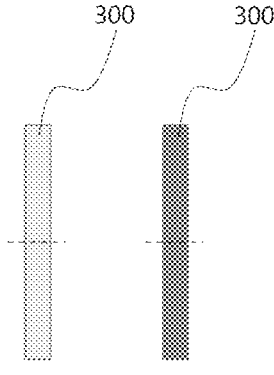
FIG. 14 is a diagram illustrating the existing rear cover.

FIG. 14 is a diagram illustrating the conventional rear cover. The rear cover 300 may be made of a single metal, for example, aluminum as illustrated in the left figure or steel as illustrated in the right figure. The aluminum has excellent conductivity and light weight, but has a disadvantage in the lifespan due to weak durability. On the other hand, the steel has advantages in terms of the lifespan due to its strong durability, but has low conductivity and heavy weight compared to the aluminum. Accordingly, a front surface of the rear cover 300 may be provided with the contact member 310 that is in contact with the brush, and the contact member 310 may be made of a metal material different from that of the rear cover 300.

Figures 15, 16:
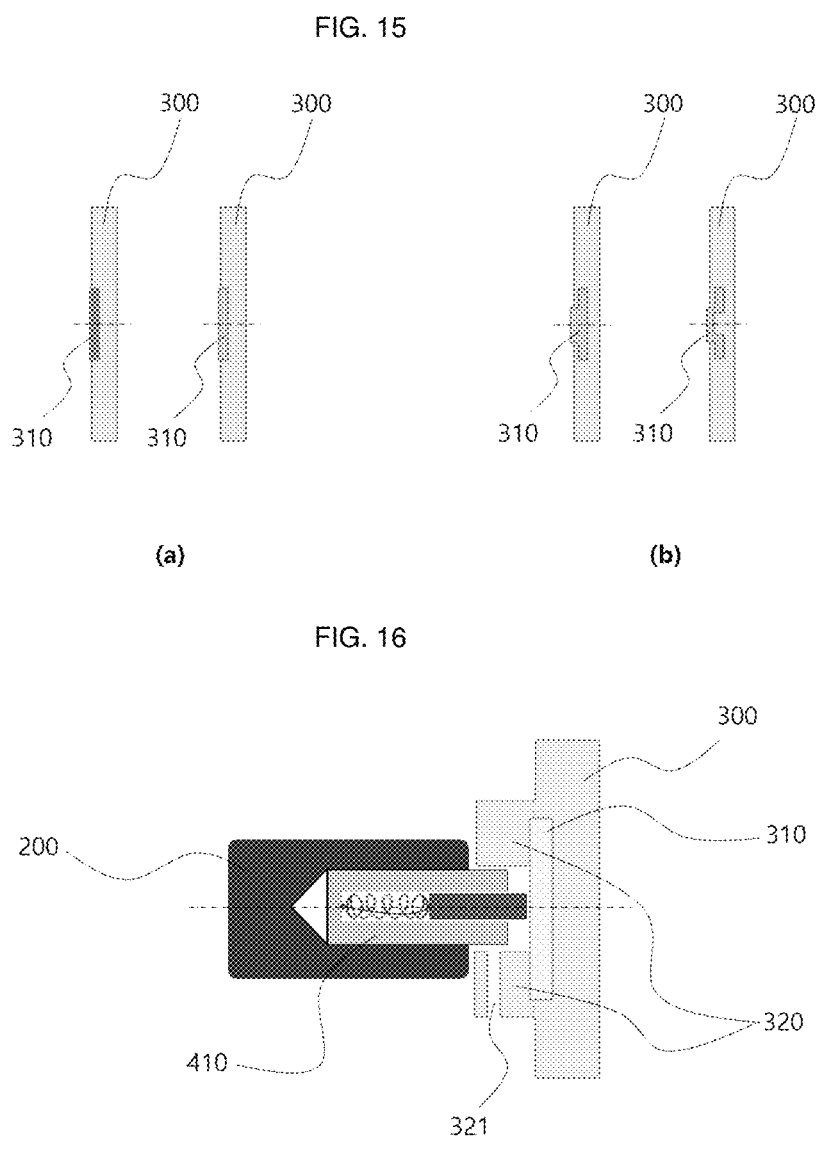

FIGS. 15 (*a*) and (*b*) are diagrams illustrating the rear cover according to the embodiment. As illustrated, the front surface of the rear cover 300 may be provided with the contact member 310 that is in contact with the brush 420. More specifically, as illustrated in FIG. 15(*a*), the rear cover 300 may be made of an aluminum material having excellent conductivity and light in weight, and the contact member 310 may be made of a steel or copper alloy material advantageous in terms of durability.

Here, since the contact level of the contact member 310 with the brush 420 is important, as illustrated in the left figure of FIG. 15(*b*), the size of the substantial contact portion of the contact member 310 with the brush 420 is reduced, so it is possible to save the costs, and a lower end portion of the contact member 310 is formed wide, and thus, is inserted into the rear cover 300, so it is possible to prevent the contact member 310 from being separated from the rear cover 300. Furthermore, as illustrated in the right figure of FIG. 15(*b*), a certain portion of the lower end portion of the contact member 310 is removed to minimize the amount of material of the contact member 310, thereby further saving the costs.

Meanwhile, referring back to FIG. 3, oil flows into the brush side along path ② to form an oil film on the contact surface of the brush 420 with the rear cover 300, which attenuates the function of the brush 420 to transmit the shaft voltage to the rear cover 300. In order to prevent this, embodiments may further adopt the following structure.

FIG. 16 is a diagram illustrating a rear cover according to another example. As illustrated, the front surface of the rear cover 300 is provided with a holder receiving part 320 that protrudes a predetermined amount to the front surface of the rear cover 300 and has a hollow center, and the brush holder 410 protruding outward of the shaft 200 may be at least partially inserted into the center of the holder receiving part 320. That is, by providing a predetermined structure surrounding the protruding portion of the brush holder 410 to narrow the oil inflow path, it is possible to prevent oil from flowing into the brush 420 side. In addition, at least one oil hole 321 penetrating through the holder receiving part 320 in the radial direction is formed in the holder receiving part 320, so the oil flowing into the holder receiving part 320 may be discharged to the outside. In this case, the oil hole 321 may be formed on the lower side of the holder receiving part 320 so that the oil may be discharged by gravity.

Figures 17, 18:
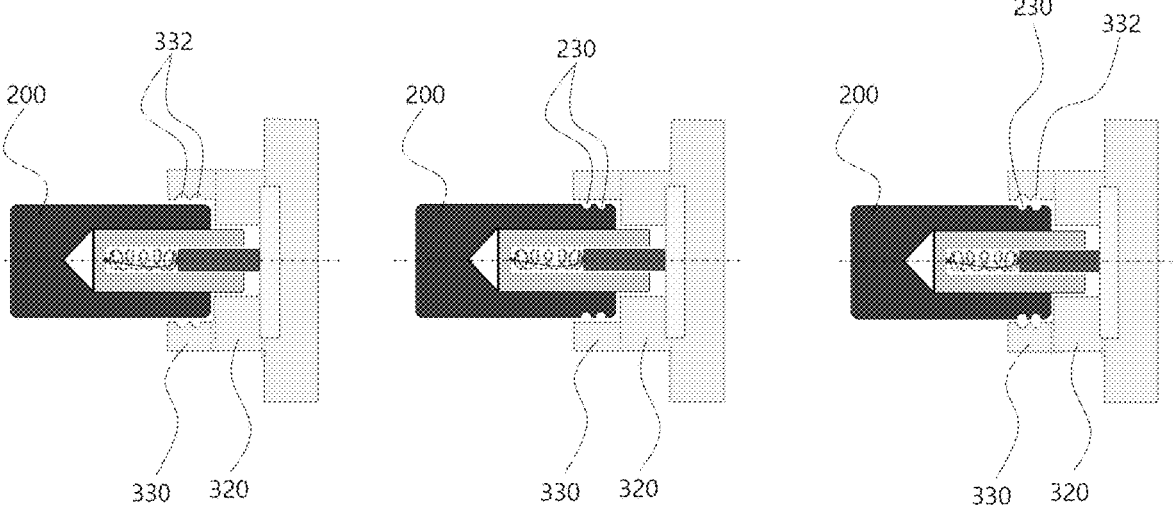
FIG. 17 is a diagram illustrating a rear cover according to an additional example of FIG. 16.
FIG. 18 is a diagram illustrating a rear cover according to another additional example of FIG. 17.

FIG. 17 is a diagram illustrating a rear cover according to an additional example of FIG. 16. As illustrated, the front surface of the rear cover 300 may be provided with the holder receiving part 320 described above in FIG. 16, the front surface of the holder receiving part 320 may be provided with the shaft receiving part 330 which protrudes to the front surface of the holder receiving part 320 by a predetermined amount and has a hollow center, and one end portion of the shaft 200 may be inserted into the center of the shaft receiving part 330. That is, by further providing a predetermined structure surrounding one end portion of the shaft 200 to further narrow the oil inflow path, it is possible to further prevent oil from flowing into the brush side. In addition, like the oil hole 321 of the holder receiving part 320, the shaft receiving part 330 may be provided with at least one oil hole 331 penetrating through the shaft receiving part 330 in a radial direction.

FIG. 18 is a diagram illustrating a rear cover according to an additional example of FIG. 17, and as illustrated, the front surface of the rear cover may be provided with the holder receiving part 320 and the shaft receiving part 330 described above in FIGS. 16 and 17, the inner peripheral surface of the shaft receiving part 330 may be provided with at least one ring-shaped groove 332 recessed inward along the circumferential direction, and at the same time or separately, the outer peripheral surface of one end portion of the shaft 200 may be provided with at least one ring-shaped groove 230 recessed inward along the circumferential direction. Accordingly, it is possible to more effectively prevent oil from flowing into the brush side during the rotation of the shaft.

Respective descriptions of the various embodiments of the present disclosure do not itemize all available combinations, and descriptions of various embodiments may be applied independently or may be applied through a combination of two or more. Features of an embodiment may be applicable to any other embodiment or combination of embodiments.

Examples of the present disclosure may improve structural robustness by inserting a ground structure into a shaft, secure durability and conductivity by mounting a contact member on a rear cover, and effectively prevent oil from flowing into a brush side by an oil inflow prevention structure into the rear cover.

In contrast to designs which include a shaft ground ring (SGR) that conducts electricity between the housing and the shaft is installed between the housing and the shaft in order to reduce the shaft voltage generated on the shaft of the motor, embodiments avoid friction is generated between the ground ring and the shaft, and the inevitable deterioration in durability of the ground ring due to the generated friction. Embodiments of the present disclosure may avoid having a brush applied to the ground ring that has reduced oil resistance and is vulnerable to damage caused by automatic transmission fluid (ATF) oil. The embodiments may provide a less expensive ground ring.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An anti-erosion motor structure, comprising:
a housing;
a stator disposed inside the housing;
a rotor disposed inside the stator;
a shaft disposed inside the rotor;
a rear cover coupled to a rear of the housing; and
a ground structure configured to ground the shaft,
wherein the ground structure is configured to be inserted into the shaft so that one side of the ground structure is in contact with the rear cover, and
wherein a depth of insertion of the shaft of the ground structure is greater than a depth of contact with the rear cover.

2. The anti-erosion structure of claim 1, wherein the ground structure comprises:
a brush holder which has a structure in which an interior portion of the brush holder is hollow and one side of the brush holder is open;
a brush, configured to be at least partially inserted into the brush holder, and which has one end in contact with the rear cover; and
a spring, inserted into the brush holder, and configured to press the brush holder.

3. The anti-erosion structure of claim 2, wherein the ground structure further comprises a ground wire that is inserted into the brush holder and is electrically connected to the brush.

4. The anti-erosion structure of claim 2, wherein an outer peripheral surface of the brush holder comprises a flange part that protrudes outward.

5. The anti-erosion structure of claim 2, wherein an outer peripheral surface of the brush holder comprises an air removal groove that is recessed inward by a predetermined amount from a first end of the brush holder to a second end of the brush holder in an axial direction.

6. The anti-erosion structure of claim 2, wherein the brush holder is configured to have a cylindrical shape, and
wherein the brush is configured to have at least one of a cylindrical shape and a prismatic shape.

7. The anti-erosion structure of claim 2, wherein a front surface of the rear cover comprises a contact member that is configured to be in contact with the brush, and
wherein the contact member is formed of a metal material that is different from a material of the rear cover.

8. The anti-erosion structure of claim 2, wherein the shaft is a solid shaft,
wherein one end of the shaft is provided with a groove that is recessed inward along an axial direction, and
wherein the ground structure is inserted into the groove of the shaft.

9. The anti-erosion structure of claim 8, wherein a diameter of the groove of the shaft is equal to or less than a diameter of the brush holder, so that the brush holder is press-fitted into the groove of the shaft.

10. The anti-erosion structure of claim 8, wherein a thread is formed on at least one of an inner surface of the groove of the shaft and an outer surface of the brush holder, so that the brush holder is screwed into the groove of the shaft.

11. The anti-erosion structure of claim 2, wherein the shaft comprises a hollow internal portion, and
wherein the ground structure is inserted into the hollow internal portion of the shaft.

12. The anti-erosion structure of claim 11, wherein a diameter of the hollow internal portion of the shaft is equal to or less than a diameter of the brush holder, so that the brush holder is press-fitted into the groove of the shaft, or
a thread is formed on at least one of an inner surface of the hollow internal portion of the shaft and an outer surface of the brush holder, so that the brush holder is screwed into the hollow internal portion of the shaft.

13. The anti-erosion structure of claim 11, wherein:
a diameter of the hollow internal portion of the shaft is configured to be larger than a diameter of the brush holder,
the ground structure further comprises an outer holder configured to receive the brush holder, and
the outer holder is inserted into the hollow internal portion of the shaft.

14. The anti-erosion structure of claim 13, wherein a diameter of a hollow internal portion of the outer holder is equal to or less than the diameter of the brush holder, so that the hollow internal portion of the outer holder is press-fitted into the brush holder, or
a thread is formed on at least one of an inner surface of the hollow internal portion of the outer holder and an outer surface of the brush holder, so that the brush holder is screwed into the hollow internal portion of the outer holder.

15. The anti-erosion structure of claim 2, wherein a front surface of the rear cover comprises a holder receiving part that protrudes to the front surface of the rear cover by a predetermined amount and is configured to have a hollow center, and wherein the brush holder protrudes outward of the shaft and is configured to be at least partially inserted into the hollow center of the holder receiving part.

16. The anti-erosion structure of claim 15, wherein the holder receiving part comprises at least one oil hole that penetrates through the holder receiving part in a radial direction, and is configured to discharge oil flowing into the holder receiving part.

17. The anti-erosion structure of claim 15, wherein a front surface of the holder receiving part comprises a shaft receiving part that protrudes to the front surface of the holder receiving part by a predetermined amount, and is configured to have a hollow center, and wherein one end portion of the shaft is inserted into the center of the shaft receiving part.

18. The anti-erosion structure of claim 17, wherein the shaft receiving part comprises at least one oil hole that penetrates through the shaft receiving part in a radial direction, and is configured to discharge oil flowing into the shaft receiving part.

19. The anti-erosion structure of claim 17, wherein an inner peripheral surface of the shaft receiving part comprises at least one ring-shaped groove that is recessed inward along a circumferential direction.

20. The anti-erosion structure of claim 17, wherein an outer peripheral surface of the one end portion of the shaft comprises at least one ring-shaped groove that is recessed inward along a circumferential direction.

\* \* \* \* \*